United States Patent [19]

Ko et al.

[11] Patent Number: 5,748,420
[45] Date of Patent: May 5, 1998

[54] ULTRA-HIGH CAPACITY REMOVABLE MEDIA CARTRIDGE CONFIGURED TO PREVENT INSERTION IN A CONVENTIONAL FLOPPY DISK DRIVE

[75] Inventors: Lawrence K. C. Ko, Fremont; John F. Kevill, La Honda, both of Calif.

[73] Assignee: Swan Instruments, Inc., Santa Clara, Calif.

[21] Appl. No.: 752,476

[22] Filed: Nov. 19, 1996

[51] Int. Cl.⁶ .................................................. G11B 23/03
[52] U.S. Cl. .................................................. 360/133
[58] Field of Search ........................... 360/132, 133

[56] References Cited

U.S. PATENT DOCUMENTS

| | | | |
|---|---|---|---|
| 5,218,503 | 6/1993 | Martin | 360/133 |
| 5,297,133 | 3/1994 | Otsuka | 360/133 |
| 5,452,154 | 9/1995 | Asakura | 360/96.5 |
| 5,530,691 | 6/1996 | Fujisawa | 360/133 |
| 5,548,571 | 8/1996 | Mistretta | 360/133 |
| 5,631,791 | 5/1997 | Osaki | 360/133 |

*Primary Examiner*—A. J. Heinz
*Attorney, Agent, or Firm*—Christie, Parker & Hale,LLP

[57] ABSTRACT

A removable media diskette cartridge configured for use with an ultra-high capacity disk drive, and precluded from use with a conventional floppy disk drive, includes a top casing half with a substantially flat front edge which overhangs the front edge of the shutter, thus preventing the shutter from being engaged and opened by a conventional shutter opening mechanism. The diskette cartridge also includes an area of increased thickness which prevents the diskette from being inserted through the access opening of a conventional 3.5" floppy disk drive.

22 Claims, 2 Drawing Sheets

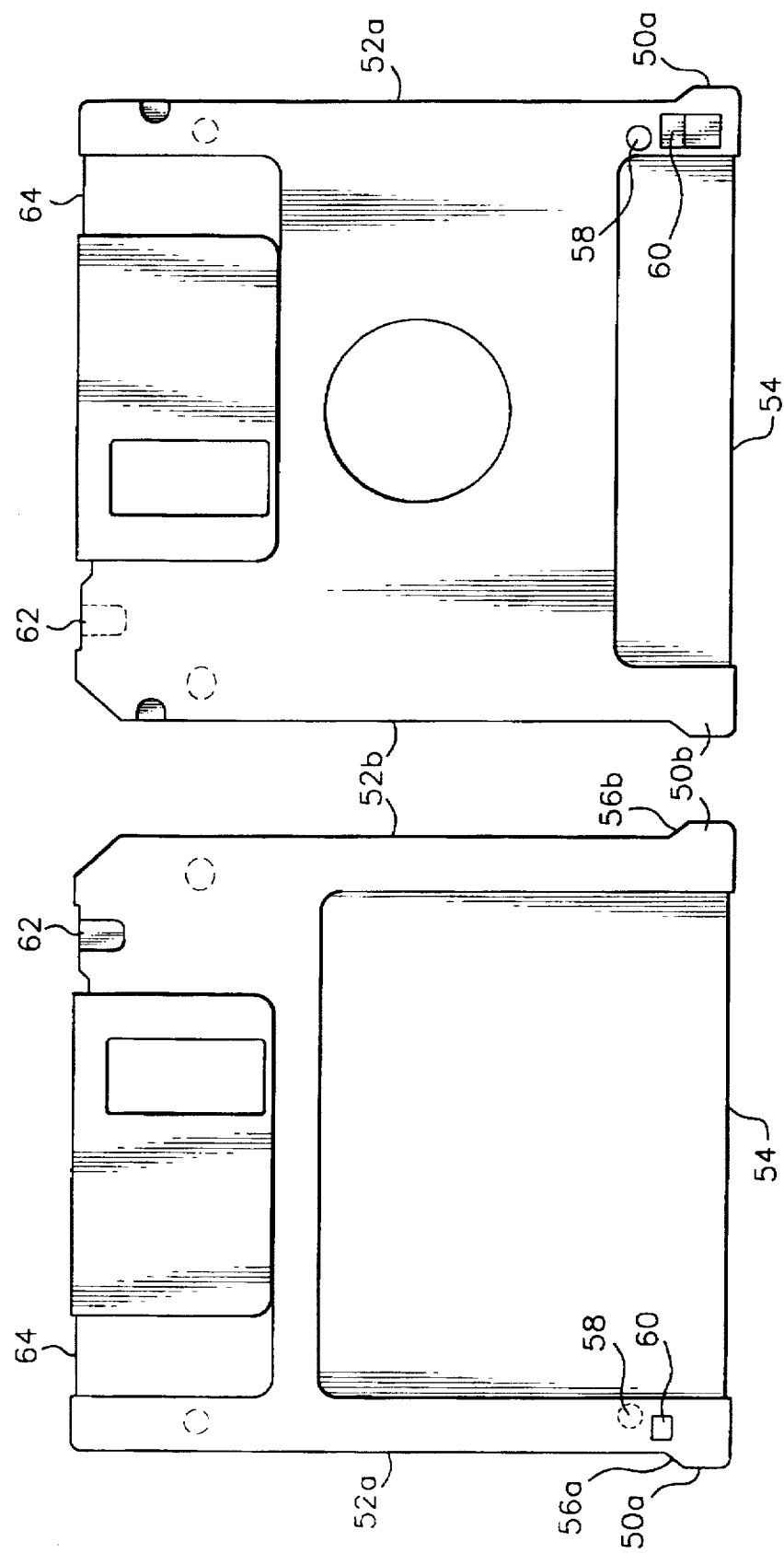

ULTRA-HIGH CAPACITY REMOVABLE MEDIA CARTRIDGE CONFIGURED TO PREVENT INSERTION IN A CONVENTIONAL FLOPPY DISK DRIVE

FIELD OF THE INVENTION

The present invention relates generally to an ultra-high capacity removable media diskette cartridge and more particularly for a cartridge configured to be used in an ultra-high capacity drive, but prevented from being inserted into a conventional floppy disk drive.

BACKGROUND OF THE INVENTION

Removable disk cartridges, particularly 3.5" removable media diskette cartridges have been well known in the computer field for several years. Generally a 3.5" removable media diskette cartridge, also referred to as a diskette, comprises a substantially rigid plastic housing which contains a rotatable flexible disk upon which data may be recorded. The sensitive surface of the recording medium is protected by a slidable shutter door, provided on the front of the housing, which, when slid open permits read/write heads to access the disk media thus permitting recording and retrieving of data. Conventionally, floppy disk drives include a mechanical linkage which engages the sliding shutter on the cartridge when the diskette is inserted into the drive, and displaces the shutter sideways in order to align an opening in the shutter with an opening in the substantially rigid plastic material of the diskette cartridge housing, thus exposing the recording media.

Conventional 3.5" recording diskettes have a formatted data storage capacity of from 720 kilobytes (KB) to approximately 1.44 megabytes (MB). While relatively convenient, such removable diskettes have insufficient storage capacity to be uniformly useful in the present computer environment, in which file sizes in excess of 5 megabytes (MB) are not unknown.

Accordingly, the industry has experienced a long felt need for removable diskettes having a storage capacity greatly in excess of the present approximately 1.44 megabyte capacity. However, such ultra-high capacity diskettes generally comprise recording media which is substantially more sensitive and is formatted at a substantially higher track density than conventional 3.5" diskettes. These characteristics of ultra-high capacity diskettes preclude their use with a conventional 3.5" floppy disk drive. Were such an ultra-high capacity diskette to be inserted into a conventional 3.5" floppy disk drive, the size, mass and continuous physical contact of the conventional read/write heads could damage the surface of the recording media, making the ultra-high capacity diskette in effect unusable. Because of the flying head recording requirements for an ultra-high capacity floppy media, the conventional method of recording, wherein the read/write head makes continuous physical contact with the surface of the media, is not able to be used.

Accordingly, some means must be provided to render an ultra-high capacity diskette uninsertable in a conventional 3.5" floppy disk drive. However, such means should allow a conventional 3.5" diskette to be insertable and recordable in a 3.5" ultra-high capacity floppy disk drive. In other words, it is highly desirable that a conventional 3.5" diskette be operable in both a conventional and a high capacity drive. At the same time, a high-capacity diskette must only be insertable in a high-capacity drive.

In addition, such means must be relatively simple, easily manufactured, and include some degree of commonality with conventionally available drives.

SUMMARY OF THE INVENTION

In accordance with practice of principles of the invention, a removable media diskette cartridge of the type adapted to contain a flexible rotatable recording disk is provided. The diskette cartridge is configured for use with an ultra-high capacity floppy disk drive, and a prevented from being used with a conventional floppy disk drive.

In a first aspect of the invention, a removable media diskette cartridge is provided that includes first and second casing halves that mate together to define a substantially hollow enclosure for containing a flexible rotatable recording disk. The first and second casing halves each comprise an outside surface, an inside surface and a front edge. The front edge of one of the casing halves includes an indentation, terminating in a flat shelf portion, which receives an opening edge, or bearing surface, of a shutter opener. The shutter opener slides along the flat shelf portion as the diskette cartridge is inserted into a high capacity floppy disk drive, thereby opening the shutter to provide access to the rotatable recording disk. The other casing half is constructed with a substantially flat front edge. A shutter, having two sides and a front edge and formed to define a substantially rectilinear C-shaped cross-section, is positioned on the diskette cartridge such that one of the sides of the shutter is adjacent the outside surface of the first casing half and the other side of the shutter is positioned adjacent to the inside surface of the second casing half. The shutter is movably mounted on the diskette cartridge such that its front edge is positioned substantially collinear with the flat front edge of the second casing half. Accordingly, when one attempts to insert the high capacity removable media diskette cartridge into a conventional floppy disk drive, the opening edge of a shutter opener contacts the substantially flat front edge of the second casing half, and is prevented from engaging the shutter opener indentation on the first casing half. The shutter is thereby prevented from being opened by the shutter opening mechanism of a conventional floppy disk drive.

In another aspect of the present invention, the first and second casing halves of the removable media diskette cartridge each comprise a generally rectangular media access opening, shrouded by the shutter when the shutter is in the normally closed position. The thickness of the first and second casing halves in the region surrounding the generally rectangular media access opening are substantially equal, such that the distance from the flexible media disk surface to the outside surface of the first and second casing halves are the same. The thickness of one of the casing halves is made substantially larger than the thickness of the second casing half in a region away from the media access opening. The thickness of the diskette cartridge in the region away from the media access opening is thus greater than the opening size of the diskette access door of a conventional floppy disk drive.

In particular, the region of increased thickness away from the media access opening lies along a longitudinal strip disposed adjacent one edge, the other edge, or both edges of the diskette.

BRIEF DESCRIPTION OF THE DRAWINGS

These and other features, aspects and advantages of the present invention will be more fully understood when considered with regard to the following detailed description, appended claims and accompanying drawings wherein:

FIG. 5 is a plan view of the surface of the top half of an additional embodiment of an ultra-high capacity diskette cartridge; and FIG. 6 is a plan view of the surface of the bottom half of a second embodiment of an ultrahigh capacity diskette cartridge.

DETAILED DESCRIPTION OF THE PREFERRED EMBODIMENT(S)

An ultra-high capacity diskette cartridge (referred to herein as a diskette), in accordance with practice of the principles of the invention, is adapted for insertion into a floppy disk drive configured for receiving ultra-high capacity diskettes, but precluded from insertion into a conventional floppy disk drive configured for receiving the more prosaic, conventional low density diskettes. For purposes of illustration, a conventional 3.5" diskette has a standard formatted data capacity of either 720 kilobytes (KB) or 1.44 megabytes (MB) realized on a flexible media disk contained within a housing customarily referred to as a 3.5" diskette.

Conventionally, a 3.5" diskette comprises a thin, generally square housing having metric dimensions of approximately 94 mm in length, 90 mm in width, and 3.3 mm thickness. Although those having skill in the art will recognize that a conventional 3.5" diskette includes various indentations, stops, detents and access openings, the cross-sectional thickness of a conventional 3.5" diskette is substantially uniform at 3.3 mm.

This relative uniformity of cross-sectional thickness is necessary because the conventional diskettes are inserted into a conventional floppy disk drive through a rectangular access door configured to receive the conventional 90 mm width and 3.3 mm thickness of a conventional 3.5" diskette. In addition, once inserted through the access door, the conventional diskette is loaded into the floppy disk drive by means of a frame which guides and controls the diskette along its sides and, therefore, is constructed to accommodate the 3.3 mm thickness of a diskette.

Figure 2:
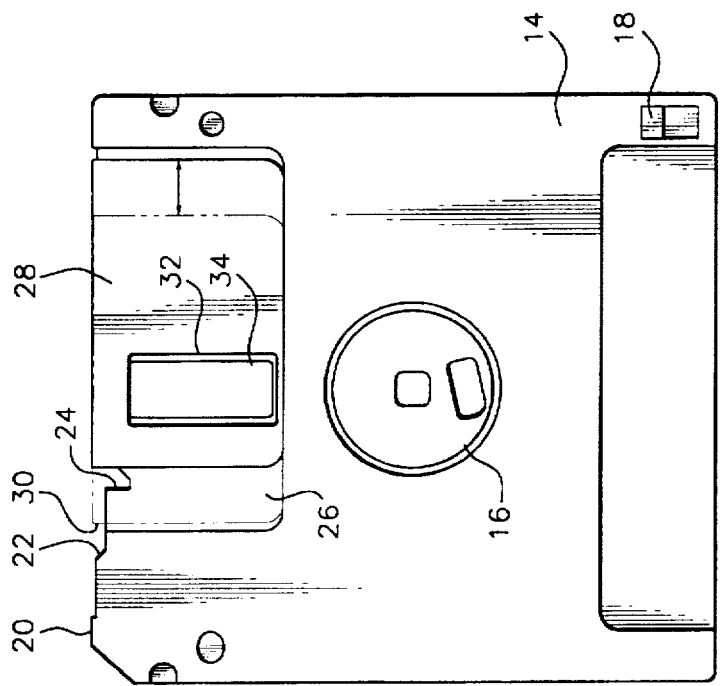
FIG. 2 is a plan view of the surface of the bottom half of an ultra-high capacity diskette cartridge in accordance with the invention, showing the shutter door displaced to expose a contained media disk.
Figure 1:
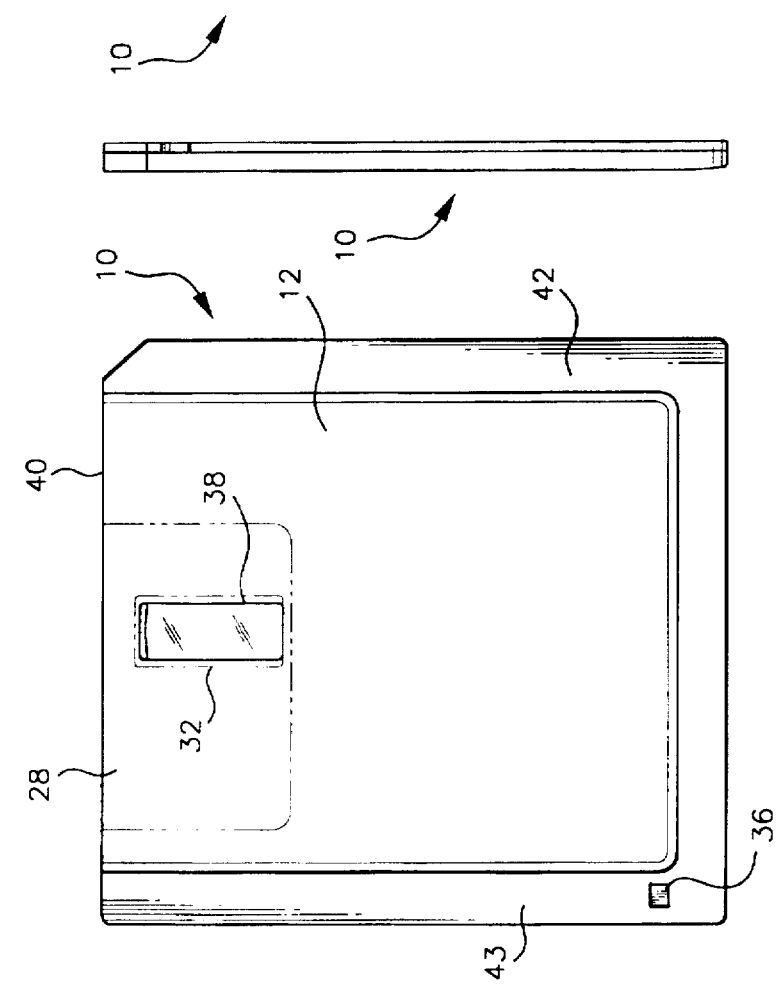
FIG. 1 is a plan view of the surface of the top half of an ultra-high capacity diskette cartridge in accordance with the invention.

In accordance with practice of principles of the invention, an ultra-high capacity diskette is depicted in top half and bottom half plan views in FIGS. 1 and 2 respectively. The ultra-high capacity diskette 10 is suitably constructed of high-density plastic material which has been injection molded into parts; a top casing half portion 12 (FIG. 1) and a bottom casing half portion 14 (FIG. 2). The configuration of the bottom half 14 (FIG. 2) of the ultra-high capacity diskette 10 is conventional, being 94.0 mm in length and 90.0 mm in width. The bottom half 14 further comprises a circular access opening 16 through which the hub holding a flexible media disk protrudes (in customary fashion) once assembly of the diskette has been completed. In addition, a write protect access opening 18 is provided, in conventional fashion, at the lower right hand corner (from the perspective of FIG. 2) on the bottom casing half 14 of the diskette.

The front surface 20 (the top edge from the perspective of FIG. 2) is cut away to form a first indentation 22, the bottom of which extends laterally across the face of the leading edge to a second indentation, or notch, 24, in customary fashion. The first indentation 22 is offset approximately 2.5 to 3 mm to the left (from the perspective of FIG. 2) of the edge of a receptacle or depression 26 which is molded into the plane of the bottom casing half 14 at which functions as a shutter-slide receptacle.

As depicted in FIG. 2, a shutter 28 (depicted in phantom in FIG. 1), when mounted on the completed diskette is normally positioned to rest against the left-hand edge (from the perspective of FIG. 2) of the receptacle 26, and is held in place against the depression lip, by means of an internal leaf spring, in conventional fashion (the shutter 28 is depicted in its normal, closed, position in FIG. 2 in phantom). When the shutter 28 is in its nominal closed position, the top left corner (from the perspective of FIG. 2) of the shutter extends outwardly beyond the laterally extending front surface of the bottom casing half 14, between the indentations 22 and 24. Because the first indentation 22 is laterally displaced from the edge of the shutter receptacle 26, a notch is formed between the top left edge of the shutter 28 and the first indentation 22. This resulting notch 30 is customarily provided in 3.5" diskettes as an engagement receptacle into which a spring-loaded shutter opening lever may be inserted so that it may bear against the upper left corner of the shutter 28 and displace the shutter sideways to the right in FIG. 2, so as to align the shutter opening 32 with a media access opening 34 formed in the bottom casing half 14, thus exposing the surface of a flexible media disk contained within the final, assembled diskette.

Returning now to FIG. 1, the top casing half 12 is also formed of a suitable high impact plastic and is, preferably, 94.0 mm in length and 90.0 mm in width. The top casing half 12 further comprises a write protect access opening 36 and a media access opening 38, both of which are molded in mirror-image position with the write protect access opening 18 and media access opening 34 of the bottom casing half 14 of FIG. 2.

The top casing half 12 is constructed with a straight leading edge 40, having none of the customary receptacles or indentations of either a conventional 3.5" diskette or of the bottom casing half 14 of FIG. 2. Further, the top casing half 12 includes two molded, longitudinally disposed, rails 42 and 43, which are regions of increased molded thickness, and which extend along the right and left hand sides, respectively, of the top casing half 12. The rails 42 and 43 are approximately 9 to 10 mm in width, and extend above the major surface of the top casing half an additional 1.5 mm. As can be best seen in FIG. 3, which is a front view of a complete ultrahigh capacity diskette in accordance with the invention, the rails 42 and 43 extend the thickness of the ultra-high capacity diskette 10 by approximately 40 to 50%, thus precluding the exemplary diskette from being inserted into a conventional floppy disk drive, adapted to receive a conventional diskette having the conventional 3.3 mm thickness.

In addition to the longitudinally disposed rails 42 and 43, further means are provided to preclude the high capacity diskette 10 from functioning in combination with a conventional floppy disk drive. In addition to being prevented from being inserted through the access door of a conventional drive, the ultra-high capacity diskette 10 in accordance with the invention includes means to prevent a conventional drive from opening the laterally displaceable shutter and, thus, exposing the sensitive high-capacity media to a pair of conventional read/write heads.

Figure 3:
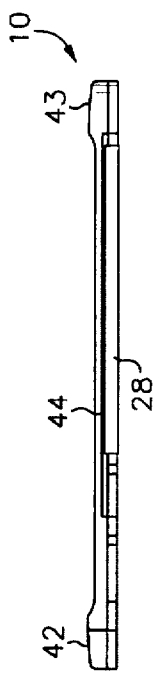
FIG. 3 is an end view of the front of the complete ultra-high capacity diskette cartridge of FIGS. 1 and 2.
Figure 4:
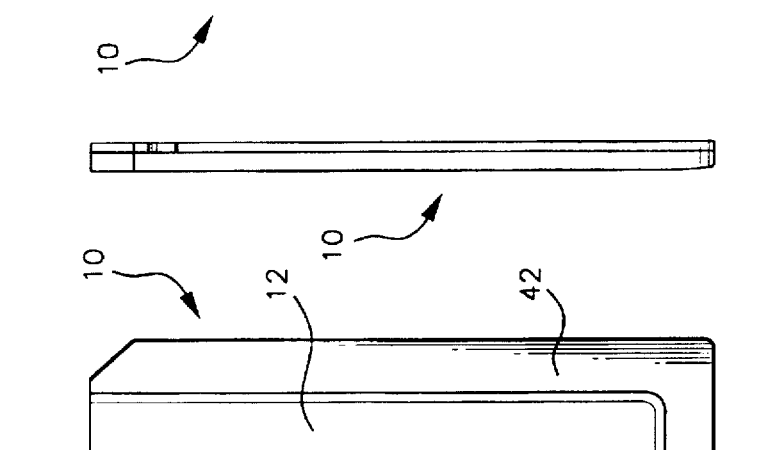
FIG. 4 is a side view of the complete ultra-high capacity diskette cartridge of FIGS. 1 and 2.

As can be seen from FIG. 3, the shutter 28 of the high-capacity diskette 10 is mounted such that its top side 44

(the side normally in contact with the top casing half 12) is not exposed over the outer surface of the top casing half 12, but rather is folded over, and bears against a depression formed in the underside surface of the top casing. Accordingly, it can be seen from FIGS. 1 and 3, that the top casing 12 overlies the shutter 28 such that the shutter cannot be accessed for displacement from the top casing portion 12 of the diskette.

In addition, the front edge 40 (best seen in FIG. 1) of the top casing half is at least substantially coextensive, and preferably overhangs to some degree, the front edge of the shutter 28. Accordingly, a conventional shutter opener, having an opening edge which is substantially orthogonal to the front of the diskette, will bear against the substantially straight edge 40 of the high-capacity diskette 10, and will be unable to contact the shutter edge. Thus, the shutter 28 of the ultra-high capacity diskette 10 can be aptly described as recessed from the front edge 40 of the top casing portion 12 with the front edge 40 suitably comprising means for preventing the shutter from being contacted by a conventional shutter opening mechanism.

Once the top and bottom casing halves (12 and 14 respectively) have been injection molded, they are combined together to enclose a flexible disk and secured about their peripheries, by tack welding, in conventional fashion. It will be evident to one having skill in the art that the indentions (cutaway portions) 22 and 24 of the bottom casing 14 of the assembled diskette remain accessible to a shutter opening mechanism whose opening edge has a height insufficient to contact the substantially straight leading edge 40 of the top casing portion 12. Such a shutter opening mechanism may be such a one as is described in copending U.S. Patent Application Entitled "Ultra-High Capacity Removable Diskette Drive", owned by the Assignee of the present invention, and filed on instant date herewith, the disclosure of which is expressly incorporated herein by reference. Such a low height profile shutter opener is able to access the resulting pocket or resulting notch 30 (FIG. 2) formed between the first indentation 22 and the edge of the shutter 28) so as to displace the shutter sideways, during cassette loading, thus opening the shutter and exposing the flexible media disk.

It is to be understood that the ultra-high capacity diskette described above is an exemplary embodiment of a diskette which is operable with an ultra-high capacity disk drive, and precluded from being operable with a conventional low capacity floppy disk drive. Longitudinal rails, defining regions of increased thickness, prevent the ultra-high capacity diskette from being inserted through the access door of a conventional floppy drive, and the overhanging, substantially flat front edge of the top casing portion of the diskette precludes the flexible media from ever being exposed to a conventional read/write head by preventing the shutter door from being opened by a conventional shutter opening mechanism. It will be understood by those having skill in the art that various other configurations of ultra-high capacity diskettes may be devised which perform the same function. For example, a single longitudinal rail, defining a region of increased thickness, may be employed with equal facility, and moreover may be located anywhere over the surface of the diskette. A region of increased thickness may be molded, glued, welded, or otherwise provided on either the top or the bottom casing portion, and may be oriented laterally or diagonally, as well as longitudinally. In particular, the function of preventing a ultra-high capacity diskette from being inserted into the access door of a conventional floppy disk drive, might be accomplished by molding, or otherwise providing, a raised logo or design at some point on the surface of the diskette. So long as the additional structure has the requisite thickness, and an ultra-high capacity floppy disk drive access door includes a corresponding hollowed out region, such additional structure would comply with the spirit of the present invention.

In addition, the function of the top and bottom casing halves may be reversed, with the substantially straight front edge which overlies the shutter and prevents the shutter from being contacted by a conventional shutter opening mechanism, may be provided on the bottom casing half, with the top casing half including the customary recesses for shutter access. It is equally within the contemplation of the present invention that the shutter access to an ultra-high capacity diskette shutter may be accomplished in a manner substantially different from the shutter access of a conventional floppy disk drive. All that is required is that the shutter of an ultra-high capacity diskette drive be unable to be accessed and displaced by the shutter opening mechanism of a conventional drive, while at the same time provide access to an appropriately designed ultrahigh capacity drive.

An alternative embodiment of a 3.5" diskette cartridge which accomplishes the objectives of the present invention will now be described in connection with FIGS. 5 and 6. In the illustrated embodiment of FIGS. 5 and 6, the 3.5" diskette cartridge comprises top and bottom casing halves which are molded together to enclose a flexible, rotatable media disk in conventional fashion. When combined together, the casing halves form a diskette cartridge having a conventional thickness of approximately 3.3 millimeters, in order to be accommodated into the diskette carriage assemblies of various floppy disk drives.

In addition, it is desirable for the various diskette cartridge manufacturers, throughout the world, to use as much of the already extent production equipment as possible for the manufacture of ultra-high capacity diskettes. This manufacturing equipment is configured for the production of low density diskettes, having standardized length, width and thickness dimensions. In order for such production equipment to be compatible with the manufacture of ultra-high capacity diskettes, it may be desirable for ultra-high capacity diskettes to retain as many of these standardized dimensions as is feasible.

However, some means must be provided to preclude these ultra-high capacity types of diskettes from being usable with a conventional low capacity floppy disk drive. Accordingly, the exemplary diskette of FIGS. 5 and 6 is provided with a local region of increased width, in the form of projections or "ears" 50a and 50b, located along the sides of the diskette (52a and 52b) at the intersection of the sides and the diskette's distal end 54.

Preferably, each ear (50a or 50b) extends approximately 1.5 millimeters in an outwardly direction from the plane surface of their respective sides (52a and 52b). Each ear is approximately 8.0 millimeters in length, including a 2.5 millimeter leading edge bevel 56a and 56b, and a radiused trailing edge which tangentially terminates at the distal end 54 of the diskette.

The projections or ears (50a and 50b) extend sufficiently outward from the plane surface of the respective sides of the diskettes, such that when the diskette is inserted into the media access opening of a conventional floppy disk drive, the ears would extend beyond the ends of the media access opening and interpose themselves to any further insertion motion beyond the media access opening of the drive. In other words, the ears would act as a "stop" against the material of a conventional floppy drive bezel if such a diskette were attempted to be inserted into the wrong type of drive.

Further, a sensor opening 58 is provided in the diskette, in a region adjacent the write protect opening 60, in order to provide means for identifying the diskette as being an ultra-high capacity diskette. For example, once such a diskette is loaded into an ultra-high capacity disk drive, a simple, spring-loaded mechanical pin may be forced into the general spatial region into which the sensor opening 58 ought to be located. If the sense opening 58 is present in the diskette, the spring-loaded pin will be allowed to fully displace normally, thus activating a contact sensor or the like, which issues a signal to the ultra-high capacity disk drive electronics indicating that an ultra-high capacity diskette is in place. In the absence of the sense opening 58, a conventional diskette's casing material would be interposed to the motion of the pin, and no signal would be sent to the ultra-high capacity disk drive. In response, the ultra-high capacity disk drive would not respond appropriately to the presence of a conventional disk, including, but not necessarily limited to, not spinning up the disk.

Alternatively, the sense opening 58 could easily be implemented in combination with an optical sensor, and identification of the diskette type could be made to the ultra-high capacity disk drive by the presence or absence of an optical signal passing through the sense opening.

In addition, a slot 62 is formed in the proximal or front end 64 of the diskette cartridge as a means of allowing only ultra-high capacity diskettes to be used in combination with an ultrahigh capacity disk drive. An ultra-high capacity disk drive may easily be provided with a stationary pin which is located so as to engage the slot 62 of an ultra-high capacity diskette. When an ultra-high capacity diskette is inserted into such a drive, the stationary pin would lie in the slot 62 in a "nested" fashion. Were a conventional low density diskette to be inserted in such an ultra-high capacity drive, the stationary pin would come into contact and abut the proximal or front end of such a diskette cartridge, thus preventing any further motion of the diskette cartridge into the drive. Accordingly, such a stationary pin in combination with the slot 62 formed in an ultra-high capacity diskette would provide means to ensure that only high capacity diskette cartridges were insertable in an ultra-high capacity-type disk drive.

Although the present invention has been described in terms of the exemplary embodiment, other alterations and modifications will become apparent to those having skill in the art after having studied the disclosure and drawings. Accordingly, it is intended that the appended claims be interpreted as covering all alterations and modifications as fall within the true spirit and scope of the present invention.

What is claimed is:

1. A removable media diskette cartridge of the type adapted to contain a flexible rotatable recording disk, the diskette cartridge configured for use with a floppy disk drive of a first type, the diskette cartridge further configured to prevent its use with a floppy disk drive of a second type, the diskette cartridge comprising:

a first casing half comprising an outside surface, an inside surface and a front edge, the front edge of the first casing half including a first, flat portion and a second, recessed portion defining an indentation, the indentation for receiving an opening edge of a shutter opener, the shutter opener sliding along the indentation as the diskette cartridge is inserted into a floppy disk drive;

a second casing half having an outside surface, an inside surface and a substantially flat front edge; and a shutter, movable on the diskette cartridge, the shutter having two sides and a front edge and formed to define a substantially rectilinear C-shaped cross-section, the shutter mounted such that one of the sides is adjacent the outside surface of the first casing half, the other side being adjacent the inside surface of the second casing half, the shutter positioned such that the flat front edge of the second casing half extends beyond the shutter front edge the shutter further positioned such that the shutter front edge extends outwardly from the second, recessed portion of the first casing half.

2. The removable media diskette cartridge of claim 1, wherein when the diskette cartridge is inserted into a floppy disk drive of the second type, the opening edge of the shutter opener contacts the substantially flat front edge of the second casing half, the shutter opener being prevented thereby from being received into the indentation of the first casing half, the shutter opener being prevented thereby from opening the shutter.

3. The removable media diskette cartridge of claim 1, wherein the first and second casing halves are affixed together to define a diskette cartridge having a metric length dimension of about 94 millimeters and a metric width dimension of about 90 millimeters.

4. The removable media diskette cartridge of claim 3, the first casing half including a circular access opening for receiving a hub attached to a flexible media disk and a generally rectangular media access opening, and wherein the second casing half is constructed in generally mirror-image fashion of the first casing half and is configured to mate with the first casing half so as to define a hollow enclosure for containing a flexible media disk, the second casing half including a substantially rectangular media access opening, the diskette cartridge further comprising:

means for preventing insertion of the diskette cartridge into a floppy disk drive of a second type, the prevention means comprising a first thickness portion in a region proximate to the media access openings of the first and second casing halves, the Prevention means further comprising a second thickness portion in a region distant from the media access openings, the second thickness portion having a thickness greater than the first thickness portion.

5. The removable media diskette cartridge of claim 4, wherein the first thickness region has a metric dimension of about 3 millimeters, and wherein the second thickness region has a metric dimension of about 4.5 millimeters.

6. The removable media diskette cartridge of claim 5, wherein the second thickness region is positioned parallel to and adjacent the longitudinal sides of the diskette cartridge, the second thickness region describing longitudinal rails extending along the length of the diskette cartridge.

7. The removable media diskette cartridge of claim 5, wherein the second thickness region is positioned adjacent to the bottom edge of the diskette cartridge and extends along its width direction.

8. A removable media diskette cartridge of the type adapted to contain a flexible rotatable recording disk, the diskette cartridge configured for use with a floppy disk drive of a first type, the diskette cartridge further configured to prevent its use with a floppy disk drive of a second type, the diskette cartridge comprising:

a first casing half including a circular access opening for receiving the hub attached to a flexible media disk and a generally rectangular media access opening;

a second casing half constructed in a generally mirror-image fashion of the first casing half and configured to mate with the first casing half so as to define a hollow enclosure for containing a flexible media disk, the second casing half including a substantially rectangular media access opening; and thickness means for preventing insertion of the diskette cartridge into a floppy disk drive of a second type, the thickness of the first and second casing halves being substantially the same in the region proximate their respective media access openings such that the distance from the flexible media disk surface to the outside surface of the first casing half is the same as the distance from the flexible disk media surface to the outside surface of the second casing half in the region proximate the media access opening, the thickness of the second casing half being substantially greater than the thickness of the first casing half in a region away from the media access opening.

9. The removable media diskette cartridge of claim 8, wherein the thickness of the second casing half and the thickness of the first casing half in the region away from the media access opening is greater than the height of a diskette access door of a floppy disk drive of the second type.

10. The removable media diskette cartridge of claim 9, wherein the combined thickness of the first and second casing halves in the region of their respective media access openings is about 3 millimeters.

11. The removable diskette cartridge of claim 10, wherein the combined thickness of the second casing half and the thickness of the first casing half in the region away from the media access opening is about 4.5 millimeters.

12. The removable media diskette cartridge of claim 8, wherein the diskette cartridge has a metric length dimension of about 94 millimeters and a metric width dimension of about 90 millimeters.

13. A removable media diskette cartridge of the type adapted to contain a flexible rotating recording disk, the diskette cartridge configured for use with a floppy disk drive, the diskette cartridge comprising:
a first casing half comprising an outside surface, an inside surface, and a front edge, the first casing half including a circular access opening for receiving the hub attached to a flexible media disk and a generally rectangular media access opening, wherein the front edge of the first casing half includes a recessed portion defining an indentation, the indentation for receiving an opening edge of the shutter opener, the shutter opener sliding along the indentation as the diskette cartridge is inserted into a floppy disk drive;
a second casing half having an outside surface, an inside surface and a substantially flat front edge, the second casing half configured to mate with the first casing half so as to define a hollow enclosure for containing a flexible media disk, the second casing half including a substantially rectangular media access opening;
a shutter, movable on the diskette cartridge, the shutter having two sides and a front edge and formed to define a substantially rectilinear C-shaped cross-section, the shutter mounted such that one of the sides is adjacent the outside surface of the first casing half, the other side being adjacent to the inside surface of the second casing half, the shutter positioned such that the flat front edge of the second casing half extends beyond the shutter front edge, the shutter further positioned such that the shutter front edge extends outwardly from the second, recessed portion of the first casing half; and thickness means for preventing insertion of the diskette cartridge into a floppy disk drive of a second type, the thickness of the first and second casing halves being substantially the same in the region proximate their respective media access openings such that the distance from the flexible media disk surface to the outside surface of the first casing half is the same as the distance from the flexible disk media surface to the outside surface of the second casing half in the region proximate the media access opening, the thickness of the second casing half being substantially greater than the thickness of the first casing half in a region away from the media access opening.

14. A removable media diskette cartridge of claim 13, wherein the combined thickness of the first and second casing halves and the region of their respective media access openings is about 3 millimeters.

15. The removable media diskette cartridge of claim 14, wherein the combined thickness of the second casing half and the thickness of the first casing half in the region away from the media access opening is about 4.5 millimeters.

16. The removable media diskette cartridge of claim 15, wherein the second thickness region is positioned parallel to and adjacent the sides of the diskette cartridge, the second thickness region describing longitudinal rails extending along the length of the diskette cartridge.

17. The removable media diskette cartridge of claim 15, wherein the second thickness region is positioned adjacent to the base of the diskette cartridge and extends along its width direction.

18. A removable media diskette cartridge configured to operate in combination with an ultra-high capacity removable media disk drive, the diskette cartridge comprising:
first and second casing halves configured to mate together so as to define a housing with a hollow enclosure;
a rotatable media disk disposed within the housing, the disk formatted to define an ultra-high data capacity;
first interference means integrally formed in the housing, for preventing the diskette cartridge from being inserted into a low capacity floppy disk drive; and
second interference means integrally formed in the housing, for preventing a read/write head of a low capacity floppy disk drive from contacting a recording surface of the flexible media disk.

19. The removable media diskette cartridge of claim 18, the first casing half including a circular access opening for providing access to a hub attached to the flexible media disk, and including a generally rectangular media access opening, the second casing half including a substantially rectangular media access opening, the thickness of the first and second casing halves being substantially the same in the region proximate their respective media access openings such that the distance from the flexible media disk surface to the outside surface of the first casing half is the same as the distance from the flexible media disk surface to the outside surface of the second casing half in the region proximate the media access opening, the thickness of the second casing half being substantially greater than the thickness of the first casing half in a region away from the media access opening.

20. The removable media diskette cartridge of claim 19, wherein the thickness of the second casig half and the thickness of the first casing half in the region away from the media access opening is greater than the height of a diskette access door of a low capacity floppy disk drive.

21. The removable diskette cartridge of claim 20, wherein the combined thickness of the first and second casing halves in the region proxidate their respective media access openings is about 3 millimeters.

22. The removable media diskette cartridge of claim 21, wherein the combined thickness of the second casing half and the thickness of the first casing half in the region away from the media access opening is about 4.5 millimeters.

* * * * *